March 30, 1926.

W. N. TIENCKEN

COLOR BLENDER

Filed July 20, 1923

William N. Tiencken.
INVENTOR
BY Victor J. Evans.
ATTORNEY

March 30, 1926. 1,579,165
W. N. TIENCKEN
COLOR BLENDER
Filed July 20, 1923  3 Sheets-Sheet 2

William N. Tiencken.
INVENTOR
BY Victor J. Evans.
ATTORNEY

March 30, 1926.　　　　　　　　　　　　　　　　1,579,165
W. N. TIENCKEN
COLOR BLENDER
Filed July 20, 1923　　　3 Sheets-Sheet 3

William N. Tiencken.
INVENTOR
BY Victor J. Evans.
ATTORNEY

WITNESS:

Patented Mar. 30, 1926.

1,579,165

UNITED STATES PATENT OFFICE.

WILLIAM N. TIENCKEN, OF SAVANNAH, GEORGIA.

COLOR BLENDER.

Application filed July 20, 1923. Serial No. 652,839.

*To all whom it may concern:*

Be it known that I, WILLIAM N. TIENCKEN, a citizen of the United States, residing at Savannah, in the county of Chatham and State of Georgia, have invented new and useful Improvements in Color Blenders, of which the following is a specification.

This invention relates to an advertising device, the general object of the invention being to provide means for presenting attractive colors to the eye to draw the attention of a person to the device, with means for blending the colors in various ways.

Another object of the invention is to provide means for rotating the movable parts of the device at different speeds from a single motor.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
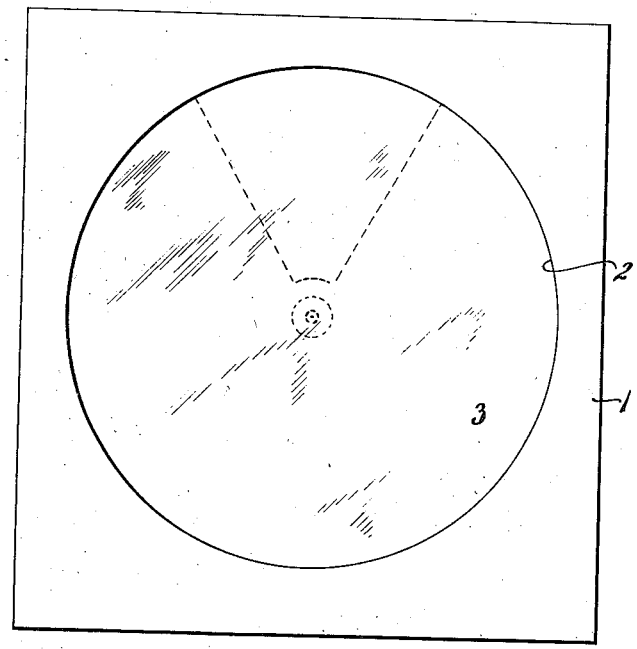
Figure 1 is a front view of the device.
Figure 2:
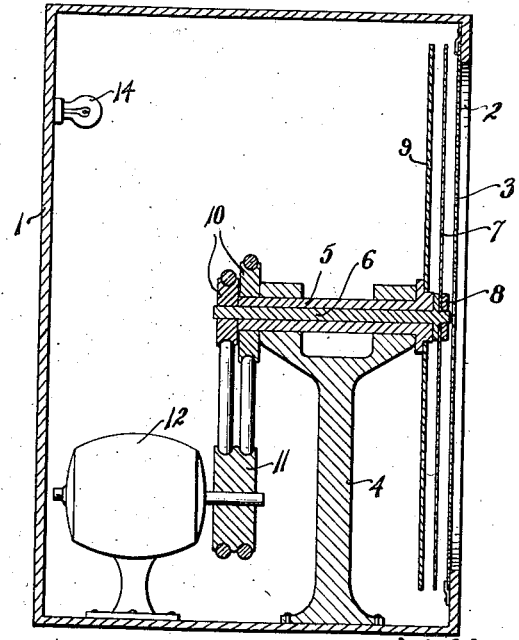
Figure 2 is a longitudinal sectional view.
Figure 3:
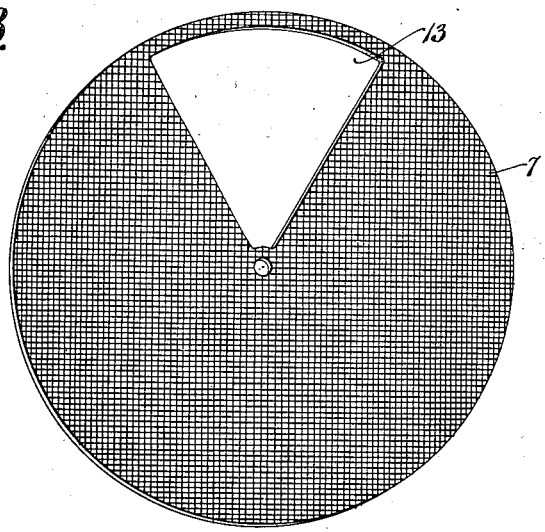
Figure 3 is a view of the shutter.
Figure 4:
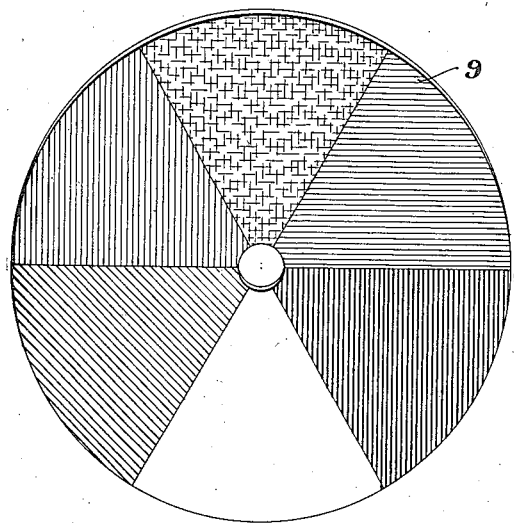
Figure 4 is a view of the color disc.
Figure 5:
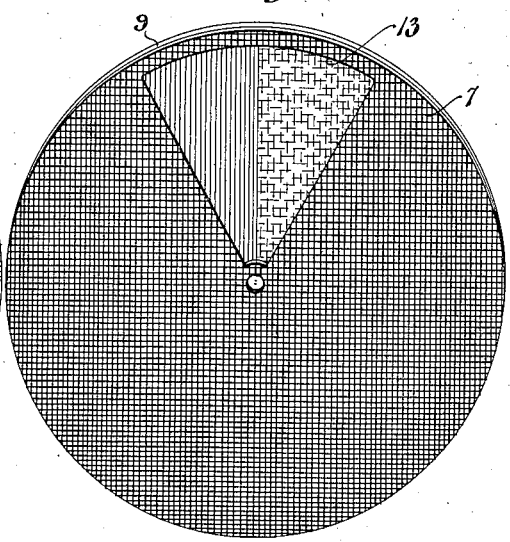
Figure 5 is a view showing the shutter as exposing two colors on the disc.
Figure 6:
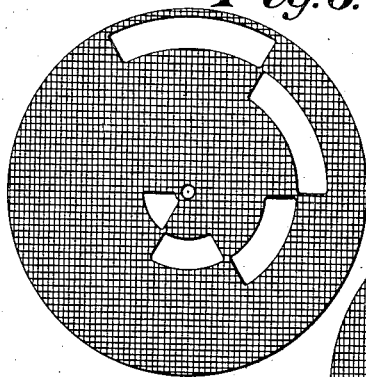
Figures 6, 7, 8 and 9 are views showing different types of shutters.
Figure 7:
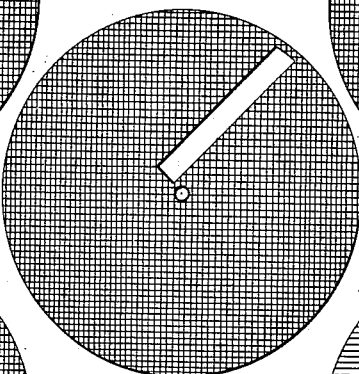
Figure 8:
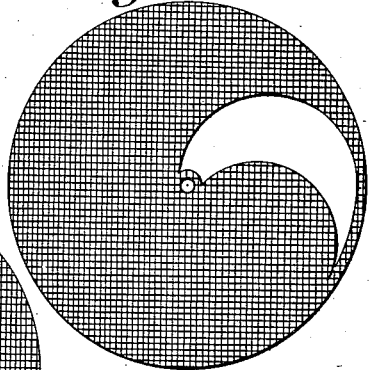
Figure 9:
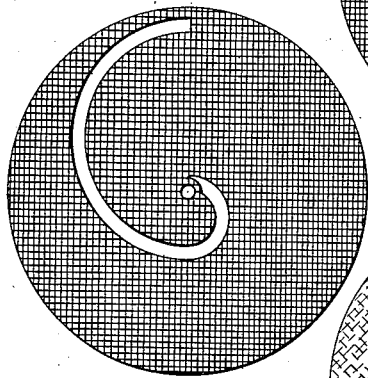
Figure 10:
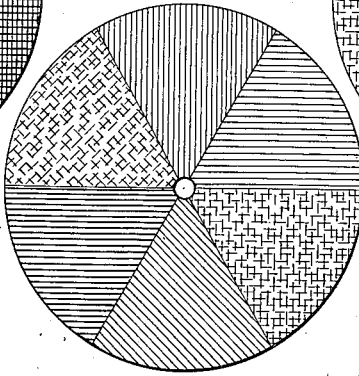
Figures 10, 11, 12 and 13 are views showing different kinds of color discs.
Figure 11:
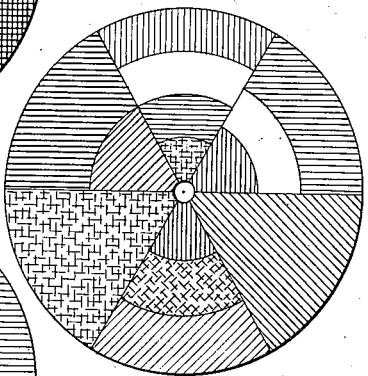
Figure 12:
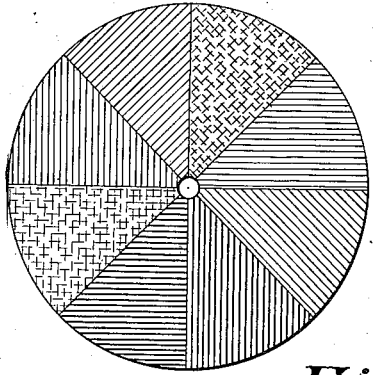
Figure 13:
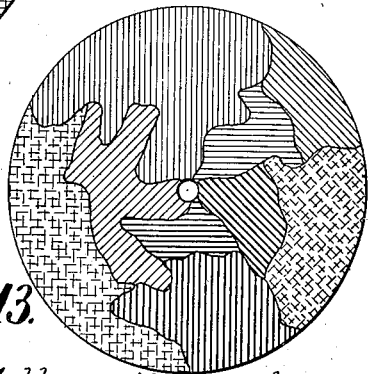

In these views 1 indicates a casing which is provided with a window 2 in its front which may be closed by a transparent member 3. A stand 4 is arranged in the casing and this stand forms a bearing for a tubular shaft 5 through which passes a shaft 6. A shutter 7 is detachably connected with the shaft 6 by the nut 8 and a disc 9 is connected with the tubular shaft immediately in rear of the shutter. Pulleys 10 are arranged on the ends of the shafts and these pulleys are belted to the double pulley 11 of a motor 12 which is arranged in the casing. Thus when the motor is in actuation both shafts will be rotated so that the shutter and disc will be revolved and by making one of the pulleys 10 of smaller diameter than the other the shutter and disc will rotate at different speeds. The shutter is provided with a segmental opening 13 which will expose portions of the disc and said disc is made of transparent material and is provided with different colors. A lamp 14 is arranged in rear of the disc so that the rays of light therefrom will pass through the disc, the opening in the shutter and through the window. Thus as the parts are rotating a solid circle of colored light will be visible to the person watching the device and by having one part revolving faster than the other the color of the circle will gradually change. For instance when two colors come opposite the opening in the shutter, say blue and yellow, the spectator will see some shade of green, the shade depending on the amount of each color that is exposed by the opening in the shutter. As the parts continue to rotate the color gradually changes and when one color is opposite the opening the circle will be of this color but when portions of two colors are opposite the opening they will be blended and thus the circle will be of a different color. By changing the pulleys the parts can be rotated at any desired speed and instead of using a transparent disc with a light behind it I may paint the disc so that this painted surface will appear through the opening in the shutter but in this case the light is not used. Figures 6, 7, 8 and 9 show shutters which are provided with different kinds of openings while Figures 10, 11, 12 and 13 shows discs the colors on which are differently arranged. Thus by using different kinds of shutters and different kinds of discs a great variety of combination of colors can be secured.

This device will blend and mix colors so as to attract the attention of a person passing the device and it can be used to blend colors that are restful to the eye and to the nerves so that it can be used as a medical device as well as an advertising device. It can also be used for stage lighting and the like. It can be made to produce any desired shade or colored light by a predetermined arrangement of colors on the disc.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A device of the class described comprising a housing having a window therein, a support in the housing, a tubular shaft journaled in the support, a solid shaft passing through the tubular shaft and having its end extending beyond the end of the tubular shaft, a shutter carried by said extended end, a disc connected with the tubular shaft and arranged in rear of the shutter, means for rotating the shafts by one motor, an opening in the shutter extending from a point adjacent the center towards the circumference and the disc having different colors thereon and arranged to appear through the opening in the shutter.

In testimony whereof I affix my signature.

WILLIAM N. TIENCKEN.